Nov. 27, 1951 — J. W. LEIGHTON — 2,576,885
BUSHING
Filed Aug. 28, 1947 — 2 SHEETS—SHEET 1
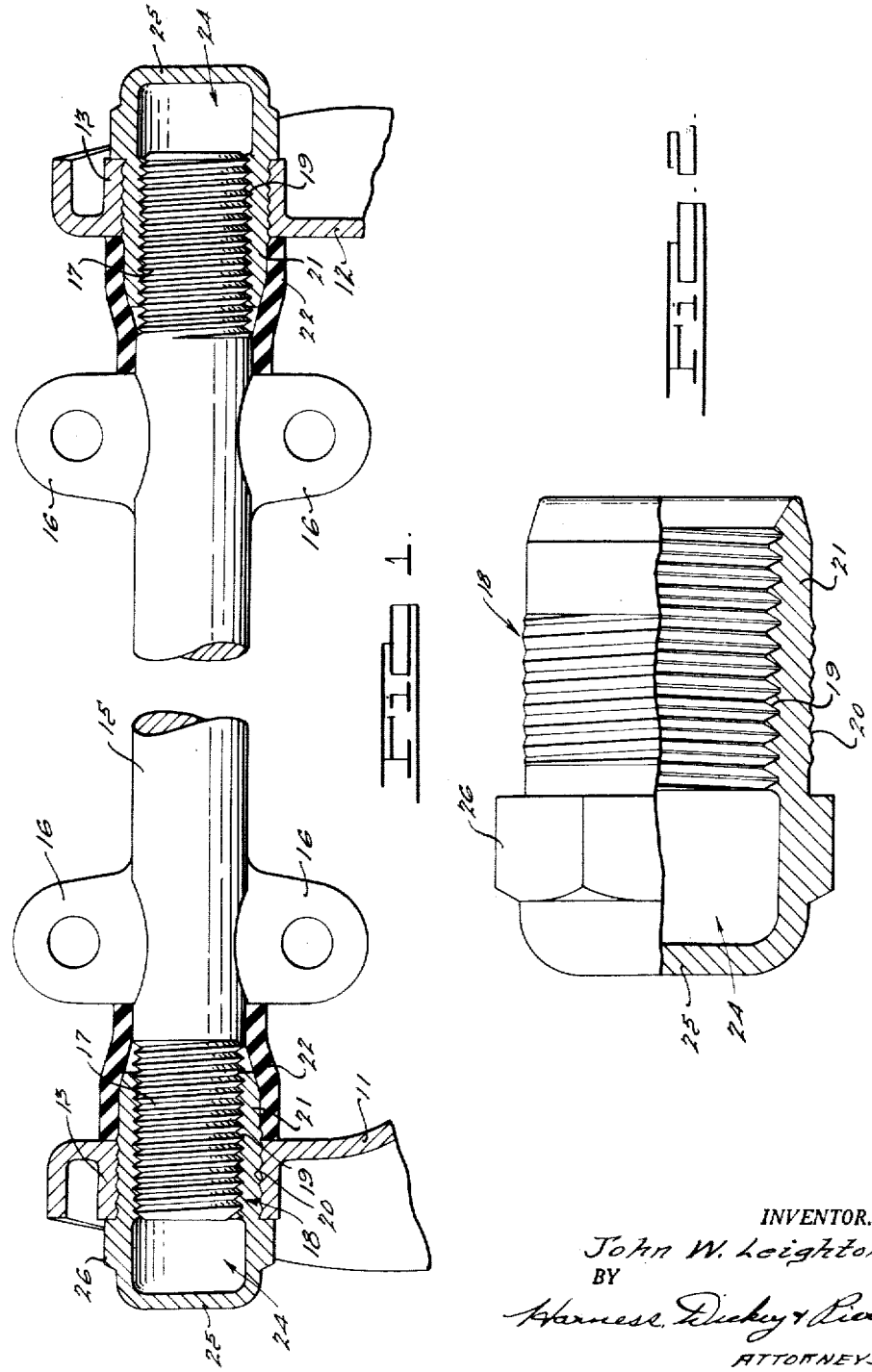
INVENTOR.
John W. Leighton,
BY
Harness, Dickey & Pierce.
ATTORNEYS.

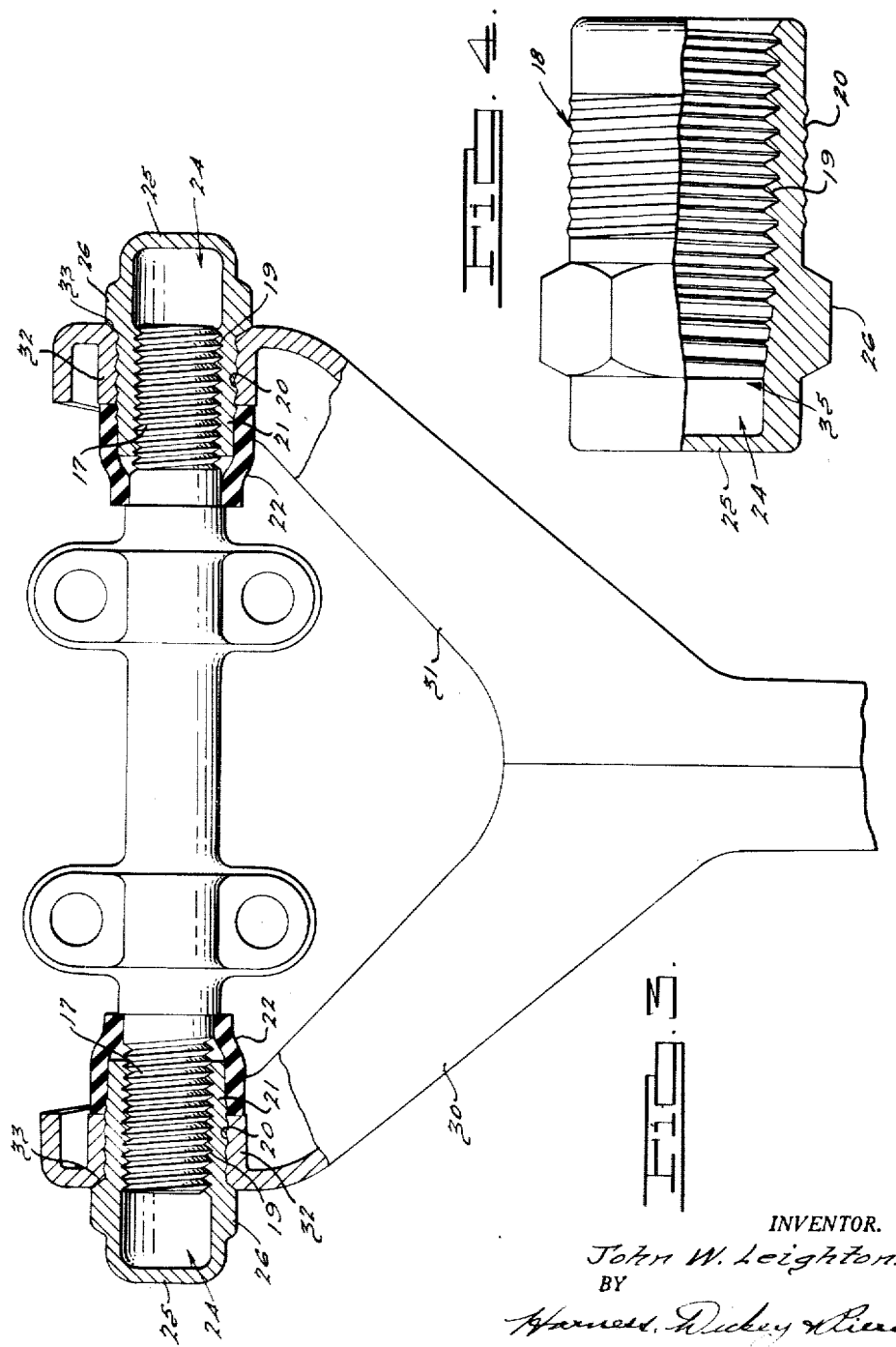

Patented Nov. 27, 1951

2,576,885

UNITED STATES PATENT OFFICE 2,576,885

BUSHING

John W. Leighton, Port Huron, Mich.

Application August 28, 1947, Serial No. 771,111

1 Claim. (Cl. 308—120)

The invention relates generally to motor vehicles and it has particular relation to an oscillatory threaded bearing for the vehicle.

The use of oscillatory threaded bearings, particularly in connection with individual wheel suspensions, is well known and most vehicles have bearings of this character. In many instances the threaded bearing includes a threaded trunnion turnable in an internally threaded bushing which is fixed in an opening in a member turnable with respect to the trunnion. It is necessary, of course, to lubricate the threaded bearing and heretofore the bushing has been provided with an end closure having a grease or lubricant fitting by means of which lubricant under pressure could be forced into the bushing and along the threads. In a structure of this character, it has been the purpose of the manufacturer to provide a threaded bearing and a means for lubricating it frequently and at those times when other parts of the vehicle are lubricated in the lubricating operation.

For many years threaded bearings of the aforesaid character, including bushings, have been used in very large quantities. In years of high production of automobiles, as many as 25,000,000 bushings per year have been manufactured, so that altogether the number of bushings that have been manufactured is very large. During the years of continued use of such threaded bearings ranging in sizes of $\frac{11}{16}$" to 1" thread diameter, an operational end clearance has been necessary between the inner end of the trunnion journaled in the bushing and the closure end of the bushing having the lubricant fitting, to allow the oscillatory movement and consequent end travel along the threads. The end clearance that has been provided has ranged from $\frac{1}{16}$" to $\frac{1}{8}$" in an axial direction. Under these specified conditions and using a good quality and well fitting synthetic rubber seal around the open end of the bushing, it has been found that after the usual lubrication, the threaded bearing would remain lubricated up to 10,000 miles of car travel, assuming that a good quality lubricant is employed. Considering that the average end clearance is about $\frac{1}{8}$", and assuming that a good seal and a lubricant of good quality have been used, one could expect, therefore, that the bearing would remain lubricated for about the distance of travel indicated.

In a great many instances, however, it could not be expected that the bearing would be satisfactorily lubricated for such a period of travel. The quality of lubricant used varies in many service establishments and it is not at all unusual to find a poorer quality lubricant being used. In this connection it is to be realized that the manufacturer of the automobile could not control the quality of lubricant used after sale of the automobile, and therefore, after first lubrication at the factory, the bearings thereafter might be lubricated with a much poorer quality of lubricant. Usually what has occurred in the past is that the owner of the automobile has had the bearings lubricated at the end of each 1,500 miles or 2,000 miles of car travel at the time when general lubrication took place. In many cases, however, lubrication has been so neglected that the bearings have run dry and have been damaged accordingly.

According to the present invention, it is proposed to use a bushing in a threaded bearing wherein the initial lubrication and quantity of lubricant held in the bushing will be sufficient to provide lubrication for more than the distance traveled by the average car owner so that the lubrication will last at least during this time. Compared to the $\frac{1}{8}$" depth of operational end clearance mentioned previously, an end clearance is now provided which is on the order of five times the previous average operational clearance and with this large reservoir for lubricant, it appears that good lubrication of the bearing can be obtained for about 50,000 miles of car travel, assuming that a good lubricant is employed and that a good quality and well fitting synthetic rubber seal is used. In other words, a large lubricant reservoir is provided which is very much greater than and additional to the space required for operational end clearance purposes so that instead of it being necessary to inject lubricant into the bushing frequently, practically a full supply of lubricant is initially provided in the bushing. Such a bushing needs no grease fitting such as has been always used heretofore, and this allows the use of a closed integral end wall for the bushing. It is evident that the invention eliminates the problem of controlling quality of lubricants and, thus, the manufacturer of automobiles by initially supplying the lubricant can be assured of proper lubrication with a good quality of lubricant for a long period of time approximating the life of the car. Aside from all this, the work of frequent lubrication is eliminated and this is particularly desirable in relation to bearings that are not readily accessible for lubrication.

One object of the present invention, therefore, is to provide an oscillatory threaded bearing for a motor vehicle which includes a bushing having a lubricating reservoir, sufficiently large that the bearing need not be lubricated perhaps more than at the time of initial installation so as to avoid the need for any ordinary lubricating means such as a lubricant fitting.

Another object of the invention is to provide an improved oscillatory threaded bearing wherein the initial supply of lubricant will last substantially during the ordinary or average life of car ownership of the vehicle.

Another object of the invention is to provide an improved bushing for use in an oscillatory threaded bearing, which includes a large lubricant reservoir so as to render it unnecessary to have a lubricant fitting or other lubricating means.

Another object of the invention is to provide an improved bushing having an internal threaded bearing surface wherein the thread may be formed with a regular or standard cutting lead on the tap without requiring that both ends of the bushing be open, so as to obtain longer tap life and also accelerate cutting of the thread.

Other objects of the invention will become apparent from the following description, from the drawings to which it relates and from the claim hereinafter set forth.

For a better understanding of the invention, reference may be had to the accompanying drawings wherein:

Figure 1 is a plan view, partly in cross-section, showing a control bar and lower suspension arm in an individual wheel suspension, wherein oscillatory threaded bearings are provided in accordance with one form of the invention.

Fig. 2 is an enlarged view, partly in cross-section of one of the bushings shown in Fig. 1.

Fig. 3 is a view similar to Fig. 1 but showing the oscillatory bearings employed in connection with the upper arm of the wheel suspension.

Fig. 4 is an enlarged view showing a bushing constructed according to another form of the invention.

Referring to Fig. 1, the arm of the suspension includes two portions 11 and 12 and although their outer ends are not shown, it is to be understood that such outer ends are operatively connected to the lower end of a wheel mounting member. Each of the arm portions has an opening defined by a hub 13, extruded outwardly from the base of the arm and these hubs are aligned. In order to pivotally connect the arm to the vehicle frame, a control bar 15 is provided and this bar has four ears or wings 16, which are apertured for receiving bolts used to secure the bar rigidly to the frame. Each end of the bar 15 has a threaded trunnion or end 17 and such ends respectively extend through the hubs.

Each of the threaded ends 17 is threaded into a bushing 18 having an internal thread 19, forming a threaded bearing surface for the end of the bar. On its external surface, the bushing has an obtuse angle thread 20 which is threaded into the hub 13 so as to lock the bushing rigidly in the hub. Ordinarily, the inner surface of the hub 13 will be cylindrical and when the bushing is threaded into the hub, the obtuse angle thread 20 will form or cut its own threads in the hub and as a result, the bushing becomes tightly locked or bound in the hub. As shown, the inner end of each bushing projects beyond the arm portion as indicated at 21 and in order to prevent leakage of lubricant or ingress of water or the like, a synthetic rubber sealing sleeve 22 is provided. This sleeve is telescoped over the projecting end of the bushing and also engages a portion of the control bar between the ears 16 and the threaded trunnion.

Beyond the threaded bearing surface 19, the bushing has a large chamber or reservoir 24 and the diameter of this chamber is shown as substantially corresponding to the root diameter of the bearing surface. As its end, the bushing or chamber is closed by an integral end wall 25 and thus the lubricant reservoir or chamber is closed except towards the threaded bearing surface. On the external periphery of the chamber portion, the bushing has a hexagonal head 26 which enable threading of the bushing into the hub 13 or removing it, and it may be observed herein that when the bushing is in its operative position, with the head 26 drawn tightly against the end of the hub 13, it is practically impossible for the bushing to ever loosen except upon application of considerable turning force.

The axial length of the lubricant chamber 24 is large enough to provide sufficient lubrication so that the need for a lubricant fitting on the bushing is eliminated. With the bushing, arm and trunnion assembled, the lubricant chamber is full of lubricant and also lubricant extends through the threads and rubber sleeve 22. This supply of lubricant in the chamber is sufficient to last, for instance, during the ordinary life of vehicle ownership so as to avoid lubrication such as now required frequently and at each time other parts of the vehicle have to be lubricated. In so far as lubricant problems are involved, this is distinctly advantageous because it insures lubrication of the threaded bearing practically for the life of the car ownership and thus avoids having a bearing which runs dry, when lubrication is forgotten or unduly delayed.

The invention is advantageous in other respects also. In the first place, by having a deep lubricant reservoir, the threads in a bushing having an integrally closed end may be cut by means of a standard or regular tap having a long, tapered cutting end. A tap of this character will cut cleaner and more accurate threads and will require less frequent sharpenings, since the cutting is distributed over a longer portion of the tap and this factor also permits operating the tap at a higher cutting speed and thus saving in tap costs is effected, and furthermore, the bushing can be manufactured in less time, so that it will cost less for this reason also.

In addition to the foregoing, a substantial saving is effected by eliminating the lubricant fitting since lubricant fittings are relatively costly compared to the cost of the bushings. It may be stated here too that considerable time is saved by not having to assemble a lubricant fitting with the bushing after it is assembled with the suspension arm and control bar. Time also is saved in lubricating after the initial lubricating operation when the vehicle is assembled. Moreover, it often is difficult to gain access to lubricating fittings and the saving in time by eliminating the lubricating operation may be substantial.

The parts are assembled by first inserting one end of the control bar into one of the hubs and then moving it sufficiently to allow insertion of the other end of the bar into the other of the hubs and then with the control bar in approximately the position shown and with the bushings supplied with lubricant, each bushing is threaded into its hub and simultaneously on to the trunnion. Normally, more than the amount of lubricant required to fill the chamber 24 will be placed in the bushing and then when the bushing is threaded into position, the lubricant will be forced to not only fill the threaded bearing area but the spaces between the rubber and metal parts also, so that this operation automatically lubricates the bearing surface. When finally assembled, therefore, the chamber 24 is filled with lubricant and the threaded bearing surface is lubricated and the only operation that has been required was that of initially depositing sufficient lubricant in the bushing to obtain this result.

In the construction shown by Fig. 3, an upper suspension arm is shown which includes portions 30 and 31 and these portions are similar to the arm portions shown by Fig. 1, except that the hubs indicated at 32, are directed inwardly. The bushing and threaded bearing shown are substantially identical to the bushing and bearing described previously with the exception that the hexagonal head, indicated at 26, has a frusto-conical side 33, next to the arm and this fits a countersunk recess at the outer end of the hub. The control bar is substantially on the same order as shown in Fig. 1 and is adapted to be fastened to the frame in substantially the same manner.

Fig. 4 shows a bushing constructed according to another form of the invention and the principal distinction between this bushing and that already described is that the lubricant chamber indicated at 35, is of a diameter approximately corresponding to the top diameter of the threads in the bushing. The first full thread in the bushing is substantially located where the first full thread in the bushings already described are located, and in each case, this first full thread is adjacent the point where the hexagonal head terminates at its inner end. Inwardly from the full thread in Fig. 4, the wall of the bushing is tapered in conformity with the end of the tap as will be understood, and from the inner end of this taper to the end wall, the wall of the chamber is cylindrical. It should be understood that the trunnion disposed in the bushing, will extend only substantially along the load carrying threaded bearing surfaces. Equal lubrication volume in both bushings described can be maintained by having the chamber in Fig. 4 deeper in an axial direction. Therefore, such chamber can be made to hold sufficient lubricant that the bushing need not have any lubricating means to provide for further lubrication. With respect to any of the bushings, the supply of lubricant could, if ever necessary, be renewed by removing the bushing and renewing the supply and then replacing the bushing.

With further respect to the size of the lubricant chamber, it is evident that the volume thereof will vary considerably with changes in diameter for any given axial depth since the volume will vary as the square of the radius. On the other hand, the area of the threaded bearing surface will increase also in relation to the square of the radius and thus with any change in diameter of the bearing, the axial length of the lubricant chamber may be allowed to remain substantially without change unless load conditions change. In ordinary wheel suspensions where the threaded bearings are employed, it appears with the average size bushings used as such bushings with a ¾" to 1" thread diameter, that the axial depth of the lubricant chamber should be approximately ⅝ of an inch and that this will provide sufficient lubricant to lubricate the bearing for a period greater than the average time of car ownership.

During use of the threaded bearing, the bushing and trunnion turn relatively and consequently the trunnion moves inwardly and outwardly depending upon the degree of oscillation that occurs. With the chamber full of lubricant and the lubricant extending along the threads and filling any open space in the rubber sleeve, initial inward movement of the trunnion may force a small amount of lubricant from the chamber and along the threads and if necessary, a small amount of lubricant may be forced over the smooth surface of the trunnion and past the end of the sleeve. Upon reverse or outward movement of the trunnion, a small space apparently will be created above the lubricant remaining in the chamber as the lubricant settles when the trunnion recedes and this space apparently will be filled by air. It may be observed here that while the sleeve should fit the trunnion surface well, it must slide on it as the trunnion moves inwardly and outwardly and air will seep into or enter the sleeve as required to replace the amount of lubricant evacuated. After the first outward movement of the trunnion and with air replacing the small amount of evacuated lubricant, lubricant will be fed very gradually or from time to time in minute amounts during continued oscillatory movements and this action seems to be influenced by the fact that the air and lubricant together are more easily compressed in the chamber. It seems that the lubricant will flow sufficiently to the bearing from time to time or gradually as a result of such compressive action so that the bearing will remain lubricated although if the bearing should become dry and heated, the anti-friction ingredient in the lubricant, which is mainly oil, will be attracted to the dry surfaces to assure lubrication. In any event, such operating factors, in conjunction with a large chamber of lubricant at the end of the bearing, will assure continued lubrication of the bearing for a length of time or mileage approximating that indicated heretofore so that the purchaser of the vehicle need not even consider lubrication of the bearing.

Although more than one form of the invention has been illustrated and described in detail, it will be apparent to those skilled in the art that various modifications may be made without departing from the scope of the appended claim.

What is claimed is:

For use in an oscillatory, threaded bearing on a motor vehicle, a bushing having one end open and its other end closed by an integral end wall, the inner surface of the side wall of the bushing being threaded substantially from the open end to a point spaced from the end wall to provide a threaded bearing surface, the space between the end wall and the portion of the threaded bearing surface that carries the load being substantially greater than the normal space required for operating clearances and a flexible tubular rubber-like sealing element adapted to coact with the open and end of the bushing and with a cooperatively threaded male bearing portion interengaged with said bushing, to oppose to the escape of lubricant at the juncture of said bushing and male bearing portion.

JOHN W. LEIGHTON.

REFERENCES CITED

The following references are of record in the file of this patent:

UNITED STATES PATENTS

| Number | Name | Date |
| --- | --- | --- |
| 2,053,620 | Leighton | Sept. 8, 1936 |
| 2,291,112 | Slack | July 28, 1942 |
| 2,344,896 | Phelps | Mar. 21, 1944 |

Certificate of Correction

Patent No. 2,576,885 November 27, 1951

JOHN W. LEIGHTON

It is hereby certified that error appears in the printed specification of the above numbered patent requiring correction as follows:

Column 6, line 60, after "open" strike out "and"; line 63, after the syllable "pose" strike out "to";

and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*